United States Patent [19]
Hodges et al.

[11] Patent Number: 5,656,174
[45] Date of Patent: Aug. 12, 1997

[54] DREDGING SYSTEM AND METHOD

[75] Inventors: Michael Hodges, Monument; Robert Leland Schwartz, Arvada; George C. Kane, Golden, all of Colo.

[73] Assignee: Solomon Venture, Casper, Wyo.

[21] Appl. No.: 602,697

[22] Filed: Feb. 16, 1996

[51] Int. Cl.$^6$ .......................... B01D 21/01; B01D 21/20; B01D 37/00
[52] U.S. Cl. .................. 210/705; 210/748; 210/767; 210/787; 210/800; 210/806; 37/307
[58] Field of Search ................................. 210/710, 768, 210/703, 769, 702, 749, 704, 767, 705, 787, 800, 806; 37/307

[56] References Cited

U.S. PATENT DOCUMENTS

| | | |
|---|---|---|
| 1,864,926 | 6/1932 | Moss et al. . |
| 2,204,584 | 6/1940 | Flower . |
| 2,961,782 | 11/1960 | Bos . |
| 3,673,716 | 7/1972 | Trondle . |
| 3,975,266 | 8/1976 | Baize ........................................ 210/710 |
| 4,541,927 | 9/1985 | Breidenbaugh ........................ 210/122 |
| 4,807,373 | 2/1989 | Sloan et al. . |
| 4,854,058 | 8/1989 | Sloan et al. . |

OTHER PUBLICATIONS

Church, et al., "Bureau Of Mines Dewatering Study To Recover A Marketable Product From An Industrial Crushed Stone Fine By–Product Slurry", SME Annual Meeting, Albuquerque, NM, Feb. 14–17, 1994.

Scheiner, "Dewatering Of Fine Particle Clay Waste Using A Flocculant", SME–AIME Annual Meeting, Atlanta, Georgia, Mar. 6–10, 1983.

Scheiner, et al., "Factors Affecting Dewatering Of Phosphatic Clay Waste Slurries", SME Annual Meeting, Denver, Colorado, Feb. 24–27, 1987.

Smith, "Characterization of Dredged River Sediments in 10 Upland Disposal Sites in Alabama", Report of RI 9549, Investigations/1995, U.S. Bureau of Mines, U.S. Department of the Interior.

Sharma, et al., "Dewatering of Alaska Placer Effluent Using PEO", RI 9442, Report of Investigations/1992, Bureau of Mines, U.S. Department of the Interior.

Zatko, et al., "Preliminary Studies on the Dewatering of Coal–Clay Waste Slurries Using a Flocculant", RI 8636, Bureau of Mines Report of Investigations/1982, U.S. Department of the Interior.

Brooks, et al., "Large–Scale Dewatering of Phosphatic Clay Waste From Polk County, FL", RI 9016, Bureau of Mines Report of Investigations/1986, U.S. Department of the Interior.

Church, et al., "Dewatering Of Mine Waste Sludges", U.S. Bureau of Mines, Tuscaloosa Research Center, Tuscaloosa, AL.

Scheiner, "Dewatering Fine Ground Waste From Quarries", U.S. Bureau of Mines, Tuscaloosa Research Center, Tuscaloosa, AL.

Church, et al., "Dewatering of Contaminated River Sediments" presented Dec. 9, 1993.

*Primary Examiner*—David A. Reifsnyder
*Attorney, Agent, or Firm*—Sheridan Ross P.C.

[57] ABSTRACT

The present invention is directed to a continuous, portable dredging system that employs a series of screens and gravity separation devices with flocculation to remove sediments from the dredged slurry. The system produces a treated water stream having low solids content and a recovered solids product having a low water content.

32 Claims, 7 Drawing Sheets

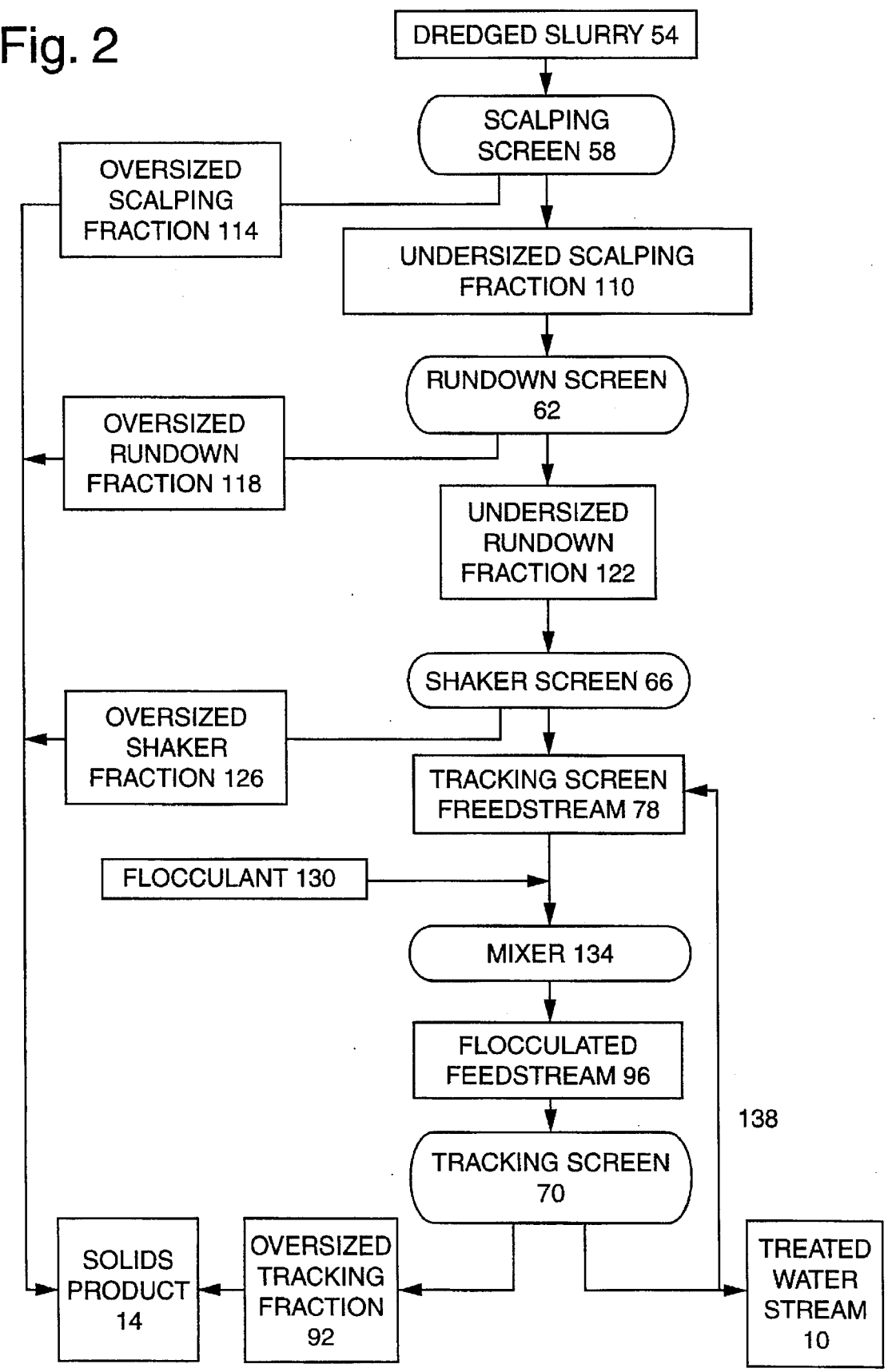

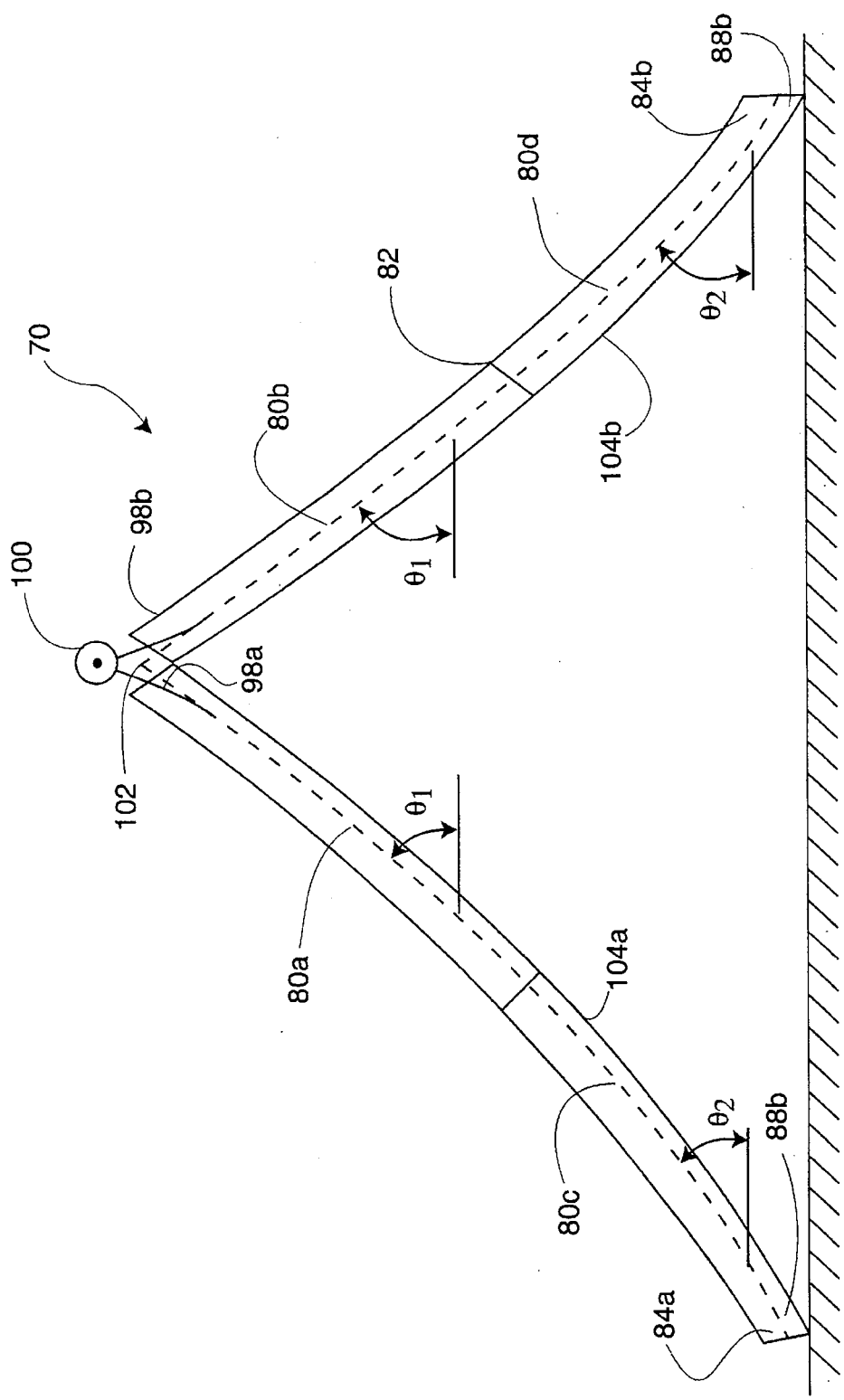

DREDGING SYSTEM AND METHOD

FIELD OF THE INVENTION

The present invention relates generally to dredging systems and specifically to portable dredging systems for waterways and other bodies of water.

BACKGROUND OF THE INVENTION

Dredges remove underwater sediments, such as sand and silt, from ponds, lakes, streams, rivers, bays, harbors and other bodies of water to clear navigation channels, prevent filling of the body of water with accumulated sediments, and remove environmental contaminants contained in the sediments. Dredges commonly are floating barges having a cutting head and pumping system to remove the sediments and a discharge line to transport the slurried sediments to an onshore location for storage, treatment and/or disposal.

Settling ponds are often used to store the dredged slurry, to separate the sediments, and to decant the water in the slurry from the sediments. The separated water can then be returned to the body of water. The sediments can be left in the settling pond or transported to a disposal site. Disposal sites are desirable for sediments containing environmentally harmful contaminants.

A problem with such operations, especially high capacity operations, is the requirement of a sizable land area to accommodate the settling ponds and the resulting loss of aesthetics, the prolonged time period required to dry the sediments in the settling pond, the significant water loss from the body of water through drainage or evaporation, and the offensive odor generated by the decomposition of the organic material in the drying sediments. Moreover, any precipitation will only extend the solids drying process. Often, the body of water must be closed to public access during dredging operations because the settling ponds are located nearby. In other cases, such as the dredging of bodies of water in densely populated areas, dredging/settling pond operations are uneconomical because of the lack of available land to accommodate settling ponds. The cost to transport the slurried sediments by truck or pipeline to a remote location can also be prohibitive.

In an attempt to overcome such limitations, the dredging barge disclosed in U.S. Pat. No. 4,541,927 to Breidenbaugh was developed. The barge includes a centrifuge and screen to separate the sediments from the slurry, a rotating tumbler to aerate the sediments, a rotary kiln to dry the sediments, and equipment to package the dried sediments for sale or disposal.

The dredging barge of Breidenbaugh is relatively complex and expensive to operate and therefore unsuitable for many applications. By way of example, the Breidenbaugh barge cannot operate continuously but only semi-continuously and therefore has a low capacity. For semi-continuous operation to be possible, it employs a number of centrifuges mounted on a rotating table. The centrifuges are expensive to operate and subject to frequent damage from large objects, such as rocks, bottles, and other debris in the sediments. Furthermore, the water produced by the system has a significant solids content when discharged, which can cause problems in applications such as those requiring low turbidity discharge water or involving the removal of environmental contaminants from the water body. This is particularly true where the sediments include material having a specific gravity close to one.

SUMMARY OF THE INVENTION

It is therefore an object of the present invention to provide a simple and inexpensive dredging system that incorporates a solids/liquid separation system. Related objectives are to provide a dredging system that eliminates or minimizes the need for settling ponds to separate water from the slurried sediments; to provide an integrated system that can continuously separate the slurried sediments from water in the dredged slurry at high throughput rates; to provide a dredging system that eliminates or minimizes the use of centrifuges; and, to the extent that centrifuges are used, to provide a system that minimizes damages to the centrifuges by objects contained in the sediments.

It is another objective to provide a dredging system that can remove substantially all of the sediments from the dredged slurry to provide a low turbidity water product for reintroduction into the body of water.

These and other objectives are addressed by the present invention. The present invention provides a dredging system for removing solid materials from a body of water that includes: (i) a dredging device for removing solid materials from the body of water to form a dredged slurry containing the removed solid materials and water; (ii) a transportation device to transport the dredged slurry from the dredging device; (iii) a first separating device for separating the solid materials having a size of at least about 150 microns from the dredged slurry to form a treated slurry; (iv) a flocculating device to contact a flocculent with the treated slurry to form a flocculated slurry containing flocculated solid materials; and (v) a second separating device to separate the flocculated solid materials from the treated slurry to form a treated water stream and a dewatered solids product. The various components can be located entirely on the dredging barge, on the barge and one or more portable trailers, or in a permanent (non-portable) installation.

The first separating device can include a first screen having a size ranging from about 10 mesh (Tyler) to about 2 inches and a second screen having a size ranging from about 10 mesh (Tyler) to about 200 mesh (Tyler). Depending upon the application, the first separating device can include additional components, such as a gravity separation device.

The flocculent causes agglomeration of fine solid materials, which facilitates separation of the fine materials by the second separating device. A "flocculent" refers to a material that causes aggregation of suspended colloidal or other fine particles in a solid/liquid slurry. Anionic, non-ionic or cationic flocculents or coagulants can be employed. Preferred flocculents include polyacrylamides, and mixtures thereof. The preferred concentration of the flocculent in the slurry to be flocculated ranges from about 0.001 to about 0.025% by weight. The flocculent is necessary for the performance of the second separating device.

The second separating device can be a first screen and a second screen arranged in a triangular-shaped configuration (i.e., an A-frame construction). The angle of the screens measured from the horizontal preferably ranges from about 30 to about 70 degrees. The mesh of the screen has a size ranging from about 1.7 mm to about 0.3 mm. This device has proven highly effective in separating the flocculated solid materials from the slurry at a high rate (i.e., ranging from about 0.4 to about 1.6 gallons per minute per square foot of screen surface area).

The dredging system can include other components to provide a lower percentage of solid materials in the treated water stream. By way of example, the system can include one or more gravity separation devices, such as a cyclone or centrifuge, to remove heavy solid materials. The system can also include a flotation device, such as an induced air or dissolved air flotation device, to float the flocculated solid materials. These components are especially useful in cases where low turbidity discharge water is required or environmentally hazardous materials are present in the dredged slurry.

In another aspect, the present invention provides a dredging method for removing solid materials from a body of water that includes the steps of: (i) dredging solid materials from the body of water to form the dredged slurry; (ii) first separating the removed solid materials having a size of at least about 150 microns from the dredged slurry to form the treated slurry; (iii) contacting the treated slurry with the flocculent to form the flocculated slurry containing the flocculated solid materials; and (iv) separating flocculated solid materials from the treated slurry to form the treated water stream and a dewatered solids product.

The present invention provides a number of advantages relative to existing dredging operations. The present invention can eliminate the need for settling ponds to effect separation of the water and solid materials in the dredged slurry. It offers a simple and inexpensive method to operate and is capable of high throughput rates. It can eliminate or minimize the need for expensive gravity separation devices, such as centrifuges and cyclones, by replacing them with a number of stationary and/or moving screens. The present invention can be operated continuously, thus further reducing operating costs, and its design permits components of the system to be located at distances of up to one-half mile or more from the dredging device itself. The present method provides a dewatered solids product having a relatively low free water content that is ready for immediate transport by conventional solids handling systems to a desired location or disposal site. Finally, the present invention provides a treated water stream having an extremely low percentage of retained solid materials.

One aspect of the present invention relates to a particular screening device that facilitates removal of fine solids to provide a stream of relatively solid-free effluent. The screen device has an A-frame construction with the screens forming the legs of the device. The angle of the screen as measured from the horizontal preferably ranges from about 30 to about 70 degrees. In one configuration, each leg of the screen device includes an upper and lower screen. The angle of the upper screens as measured from the horizontal can be different from the angle of the lower screens as measured from the horizontal. The opening size of the upper and lower screens can differ, with the upper screens having a smaller opening size than the lower screens to facilitate dewatering of the collected solids.

BRIEF DESCRIPTION OF THE DRAWINGS

FIG. 2 is a flow schematic of the preferred embodiment depicted in FIG. 1;

FIGS. 3A–B are cross-sectional views of different embodiments of the tracking screen;

DETAILED DESCRIPTION

Figure 1:
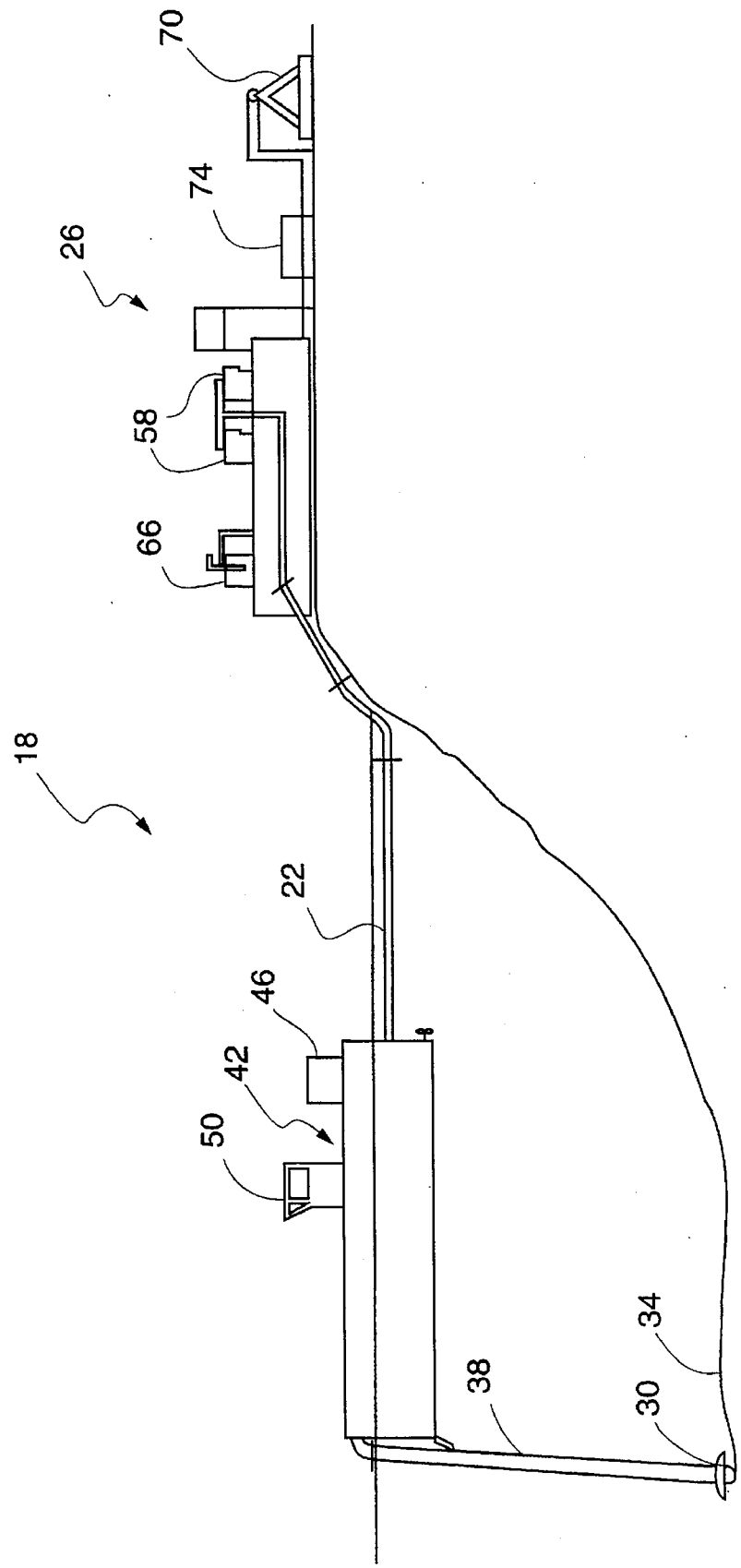
FIG. 1 is a perspective view of a preferred embodiment of the present invention.

FIGS. 1–2 depict a preferred embodiment of a dredging system according to the present invention that can remove and treat sedimentary materials from bodies of water, such as ponds, lakes, streams, rivers, and other waterways, at relatively high rates to provide a treated water stream 10 and a solids product 14. As shown in FIGS. 1–2, the dredging system includes a dredge assembly 18, a slurry pipeline 22, and a water treatment assembly 26.

The dredge assembly 18 in the dredging system can include a cutting head 30 for dislodging sediments 34, a suction line 38 for removal of the dislodged sediments, and a barge subassembly 42. The barge subassembly 42 further includes a motor 46, a drive train (not shown), lift pumps (not shown), and a pilot house 50. The dredge assembly 18 can be a hydraulic dredge as shown in FIG. 1 or a dipper or elevator dredge. Although the desired capacity of the dredge assembly 18 depends upon application, the dredge assembly 18 preferably has a capacity of at least about 800 and more preferably from about 1000 to about 1400 gpm. Hydraulic dredges are preferred, because dipper and elevator dredges generally have significantly lower capacities than hydraulic dredges.

The slurry pipeline 22 in the dredging system transports the dredged slurry 54 from the dredge assembly 18 to the water treatment assembly 26. The slurry pipeline is generally of a hard plastic or aluminum construction with flexible rubber hose attachments.

The water treatment assembly 26 in the dredging system can include a scalping screen 58, a rundown screen 62, a shaker screen 66, a tracking screen 70, and a generator 74. As will be appreciated, the screen types and numbers of each type of screen in the assembly 26 depend upon the characteristics of the sediments and the desired throughput.

The assembly 26 in FIGS. 1–2 is applicable to dredged slurries having particles of a broad range of sizes. For example, a typical dredged slurry for this assembly 26 has solids ranging in size from about 1 micron to about 6 inches and more typically from about 1 micron to about 4 inches. More uniform dredged slurries may require fewer types of screens and/or fewer screens of a given type.

The water treatment assembly 26 can be mounted on one or more trailers and be self-contained for portability. The use of the assembly 26 permits a body of water to be dredged without using excessive land areas as settling ponds. Accordingly, bodies of water, such as ponds on golf courses, can be dredged without closing the water bodies or adjacent areas to the public.

The scalping screen 58, rundown screen 62, and shaker screen 66 in the water treatment assembly 26 are preferably sized to provide a tracking screen feedstream 78 with at least about 95% by weight of the contained solids having a particle size of preferably no more than about 180 microns, more preferably no more than about 75 microns, and most preferably no more than about 37 microns. The scalping screen 58 preferably has a screen size no coarser than about 2 inches and more preferably ranges from about 1 to about 0.25 inches. The rundown screen 62 preferably has a screen size no coarser than about 0.25 inches and more preferably ranges from about 4 to about 35 mesh (Tyler). The shaker screen 66 preferably has a screen size no coarser than about 48 mesh (Tyler) and more preferably ranges from about 65 to about 150 mesh (Tyler). The scalping screen 58, rundown screen 62, and shaker screen 66 can be a linear shaker, trommel, stationary or any other suitable type of screening device. Preferably, the scalping and shaker screens are each a Model 58 FLO-LINE CLEANER PLUS manufactured by DERRICK CORPORATION.

Figure 3A:
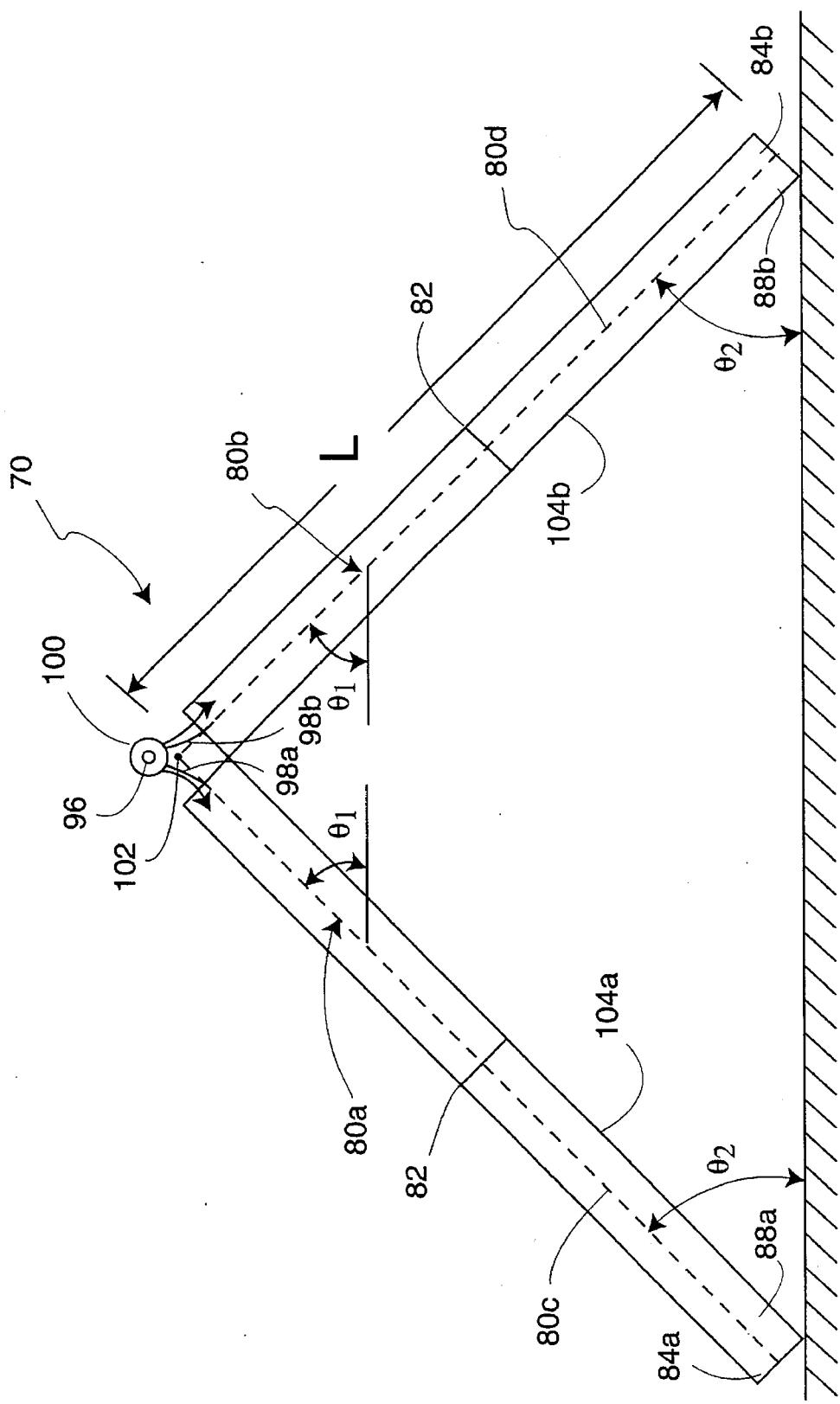

The preferred embodiment of the tracking screen 70 in the water treatment assembly 26 is depicted in FIG. 3A. The tracking screen is an A-frame-shaped device having two upper screens 80a,b and two lower screens 80c,d connected by way of an articulated joint 82a,b to the lower ends of the upper screens 80a,b. The angle $\theta_1$ from the horizontal for the two upper screens 80a,b preferably ranges from about 40 to about 70 degrees, more preferably from about 45 to about 65 degrees, and most preferably from about 50 to about 60 degrees. The angle $\theta_2$ from the horizontal for the two lower screens 80c,d preferably ranges from about 30 to about 60 degrees, more preferably from about 35 to about 55 degrees, and most preferably from about 40 to about 50 degrees. The angles $\theta_1$ and $\theta_2$ differ in magnitude to control the velocity of the agglomerated particles. Preferably, $\theta_1$ is larger than $\theta_2$. The angles $\theta_1$ and $\theta_2$ can, however, also be the same magnitude as shown in FIG. 3A. The articulated joints 82a,b and pivot point 100 permit the angles $\theta_1$ and $\theta_2$ to be adjusted during operation of the tracking screen.

The angles $\theta_1$ and $\theta_2$ are important to controlling the final particle size of the agglomerated particles in the oversized tracking fraction 92. As will be appreciated, the size of the agglomerated particles increases as the agglomerated particles roll down the upper and lower screens. The effect is very similar to a snowball increasing in size as it rolls down a snow-covered hill. To maximize the size increase of the agglomerated particles on the lower screen, it is important that the lower screen have a shallower angle $\theta_2$ than the $\theta_1$ of the upper screen. A shallower angle equates to a lower velocity of the agglomerated particles, which in turn relates to a greater increase in the size of the agglomerated particles due to increased residence time of the agglomerated particles on the lower screen. Accordingly, it is desirable that the residence time of the agglomerated particles on the upper screen be less than the residence time of the agglomerated particles on the lower screen to maximize the increase in the size of the agglomerated particles. The larger size of the agglomerated particles equates to a higher degree of dewatering of the oversized tracking fraction 92. The transition from the steeper upper screen to the shallower lower screen can be facilitated by having a curved junction of the upper and lower screens as shown in FIG. 3B. Moreover, other embodiments of the invention are directed to adjustable slopes for angles of the screen surface to accommodate differing conditions relating to the particle size, density, etc. Such adjustments can be achieved by various means known to those with skill in the art.

The total length of the screens 80a–d is preferably sufficient to effectuate separation of substantially all of the particles from the slurry. The total length L (in feet) of each set of upper and lower screens 80a,c and 80b,d preferably ranges from about 4 to about 12, more preferably from about 4 to about 10, and most preferably from about 4 to about 8 feet.

The upper and lower screens preferably have different sized openings to maximize the degree of dewatering of the oversized tracking fraction 92. As noted above, the size of the agglomerated particle on the upper screen is smaller than on the lower screen. Because a larger screen opening size yields a higher degree of dewatering, it is desirable that the lower screen have a larger screen opening size than the upper screen to better dewater the oversized tracking fraction 92. The upper and lower screens can be constructed as woven wire square mesh screens or as slotted wedge-wire screens, and more preferably as slotted wedge-wire screens.

The screen opening size of the two upper screens 80a,b preferably ranges from about 0.3 mm to about 0.9 mm, more preferably from about 0.3 mm to about 0.7 mm, and most preferably from about 0.4 mm to about 0.6 mm. The screen size of the two lower screens 80c,d preferably ranges from about 0.3 mm to about 1.70 mm, more preferably from about 0.4 mm to about 1.0 mm, and most preferably from about 0.6 mm to about 0.9 mm.

The screen sizes of the upper and lower screens are significantly greater than the screen size of the shaker screen 66. For optimal results, it is desired that the nucleation and agglomeration of particles induced by the flocculent be initiated before the contact of the flocculated feedstream 96 with the tracking screen 70. The nucleation and agglomeration processes are a result of the mixing of the flocculent 130 and the tracking screen feedstream 78 coupled with the residence time of the flocculent 130 in the flocculated feedstream 96 before the contact of the flocculated feedstream 96 with the tracking screen 70.

The dredging system 18 described above has a high throughput. By way of example, the maximum capacity of the dredging system preferably ranges from about 300 to about 2,000 gpm, more preferably from about 400 to about 1750 gpm, and most preferably from about 600 to about 1200 gpm of slurried materials. The system 18 is able to produce an amount of solids product 14 ranging from about 20 to about 90, more preferably from about 30 to about 75, and most preferably from about 40 to about 60 cubic yards/hour. The solids product 14 preferably constitutes at least about 70, more preferably at least about 80, and most preferably at least about 90% by weight of the solids in the dredged slurry 54.

The dredging system is capable of producing a solids product having a relatively low water content, and a treated water stream having relatively low solids content. The solids product 14 preferably has no more than about 60% by weight and more preferably no more than about 50% by weight water and most preferably the water content ranges from about 20 to about 40% by weight water. The treated water stream 10 preferably has a solids content of no more than about 20 and more preferably no more than about 10% by weight solids and most preferably ranging from about 0.1 to about 1.5% by weight solids.

In operation (see FIGS. 1 and 2), the cutting head 30 in the dredge assembly 18 is lowered to the sediments 34 at the bottom of the body of water and rotated to cut through and dislodge the sediments 34. As will be appreciated, the cutting head can be a conventional rotary blade device. The cutting head 30 can be operated by the drive train of the dredge assembly 18. To operate and deploy the head, the drive train can include a flexible drive shaft or a drive shaft having a universal joint or a hydraulic motor (not shown) to permit angular redeployment of the cutting head 30 and suction line 38 as desired.

The dislodged sediments are sucked into the suction line 38 to form the dredged slurry 54. The suction line 38 can be articulated in one or more locations along its length for angular deployment. The dredged slurry passes from the suction line 38 through one or more lift pumps (not shown) to the slurry pipeline 22. The slurry pipeline transports the dredged slurry 54 from the dredge assembly 18 to the water treatment assembly 26, which is generally located on shore. As will be appreciated, the water treatment assembly 26 can alternatively be located on a barge for use in densely populated or other inaccessible areas.

The solids content of the dredged slurry 54 can vary depending upon application. Typically, the dredged slurry contains from about 10 to about 40% by weight solids, more typically from about 15 to about 35% by weight solids, and most typically from about 20 to about 30% by weight solids.

The dredged slurry 54 is passed first through the scalping screen 58 and an undersized scalping fraction 110 is then passed through the rundown screen 62 to form an undersized rundown fraction 122. The coarsest particles are thereby removed in an oversized scalping fraction 114 and an oversized rundown fraction 118. The oversized scalping and rundown fractions 114, 118 are combined to form a portion of the solids product 14.

The undersized rundown fraction 122 is next passed through the shaker screen 66 to form a tracking screen feedstream 78 and an oversized shaker fraction 126. The shaker oversized fraction 126 is combined with the oversized scalping and rundown fractions 114, 118 to form a part of the solids product 14. The tracking screen feedstream 78 preferably contains from about 5 to about 15% by weight of solids. To optimize the formation of large, robust, flocculated particles, the tracking screen feedstream contains from about 10 to about 15% by weight of the solids.

A flocculent 130 can be contacted with the tracking screen feedstream 78 to form the flocculated feedstream 96. The flocculent 130 causes agglomeration of the fine particles in the flocculated feedstream and thereby enhances the separation of the particles from the liquid in the feedstream 96. The flocculent 130 is preferably one or more water soluble polymers and more preferably is selected from the groups polyethylene oxide, polyacrylamides, and mixtures thereof. Although the type and amount of flocculent contacted with the tracking screen feedstream depends upon the feedstream characteristics, it is preferred that the amount be at least about 0.001% by weight and more preferably range from about 0.005 to about 0.25% by weight and most preferably range from about 0.010 to about 0.20% by weight of the tracking screen feedstream. An in-line mixer 134 can be employed to mix the flocculent 130 with the tracking screen feedstream 78. To provide adequate mixing, the velocity through the in-line mixer is preferably at least about 3 fps. The flocculent is prepared and diluted by calibrated metering pumps and appropriate mixers.

For best results, the flocculent is added at a number of isolated points upstream of the in-line mixer. It has been discovered that multiple-point injection requires less flocculent than single-point injection for adequate flocculation. By way of example, for single-point injection, the most preferred flocculent dosage ranges from about 2.5 to about 3.0 lbs/ton of solids in the tracking screen feedstream and for dual-point injection from about 1.8 to about 2.0 lbs/ton.

Before flocculation, the tracking screen feedstream 96 can be combined with a tracking screen recycle feedstream 138 (to reclaim the flocculent in the recycle feedstream, minimize external dilution, and maintain a constant slurry density) and passed through the tracking screen 70 to form oversized tracking fraction 92, and treated water stream 10. The tracking screen recycle feedstream 138 is a split of the treated water stream 10. The recycle feedstream preferably ranges from about 5 to about 50% by volume of the treated water stream 10.

Referring to FIG. 3A, the operation of the tracking screen 70 will be described. The flocculated feedstream 96 is introduced at the top of the screens 80a,b in an overhead conduit 100. The flocculated feedstream 96 is depicted as an arrow coming out of the plane of the page. The feedstream 96 passes over weirs along the length of the conduit 100. It has been discovered that 90% or more of the water in the feedstream 96 passes through the upper 50% of the cross-sectional area of each upper screen. The oversized tracking fraction 92 flows down the length of each screen and discharges at the upper portion 84a,b of the leg base. The treated water stream 10 flows down an inner surface 104a,b that is impervious to water and discharges at the lower portion 88a,b of the leg base. The fraction 92 and stream 10 are collected and routed to the appropriate location.

It is important that the velocity of the tracking screen feedstream be maintained at levels sufficiently low to inhibit comminution of the flocculated particles. The preferred velocity of the feedstream is no more than about 4, more preferably ranges from about 0.25 to about 2 and most preferably ranging from about 0.5 to about 1.0 fps. It is further important that the agglomerated particles in the feedstream not be allowed to free fall onto the tracking screen surface. The vertical free fall distance between the point of discharge of the agglomerated particles from the overhead circuit 100 and the tracking screen surface first contacted by the particles is preferably no more than about 1, more preferably no more than about 0.5 inches, and most preferably eliminated by the use of flexible impermeable membranes to transition the slurry overflow from the conduit to the screens. The preferred composition of the membrane is polyethylene-impregnated fabric.

The flexible impermeable membranes 98a,b transition the flow from the conduit to the upper screens and from the upper screens to the lower screens without a vertical free fall of the flocculated feedstream onto the screens. As will be appreciated, the kinetic energy of such a free fall can cause the agglomerated particles to disintegrate or break apart. The membrane is preferably flexible so that it will flex in response to the adjustment of the angles $\theta_1$ and $\theta_2$ of the upper and lower screens.

The oversized tracking fraction 92 is combined with the above-noted oversized fractions 114, 118, and 126 to form the dewatered solids product 14. The dewatered solids product 14 can be used for various purposes, such as fill material for landscape contouring or topsoil addition.

The treated water stream can be reintroduced into the body of water that is being dredged.

The instantaneous separation of fine and ultrafine materials from the dredged slurry at high throughput rates is a surprising and unexpected result. Existing dredging systems have been unable to instantaneously separate fine and ultrafine material because of the difficulty, if not impossibility, of removing the fine and ultrafine material using gravity or size separation techniques.

Alternative embodiments of the present invention can be employed depending upon the characteristics of the sediments to be processed and the dewatered product and treated water stream to be produced. As will be appreciated, equipment configuration, process condition criteria (e.g., screen sizes, solids densities, flowrates, and chemical additions), and job specific subcomponents depend upon the feed rate, the dredged slurry solids content, the dredged slurry particle size distribution, the solids separation efficiency of the specific equipment with respect to each size fraction in the dredged slurry, and the flow distribution, among other things.

Figure 4:
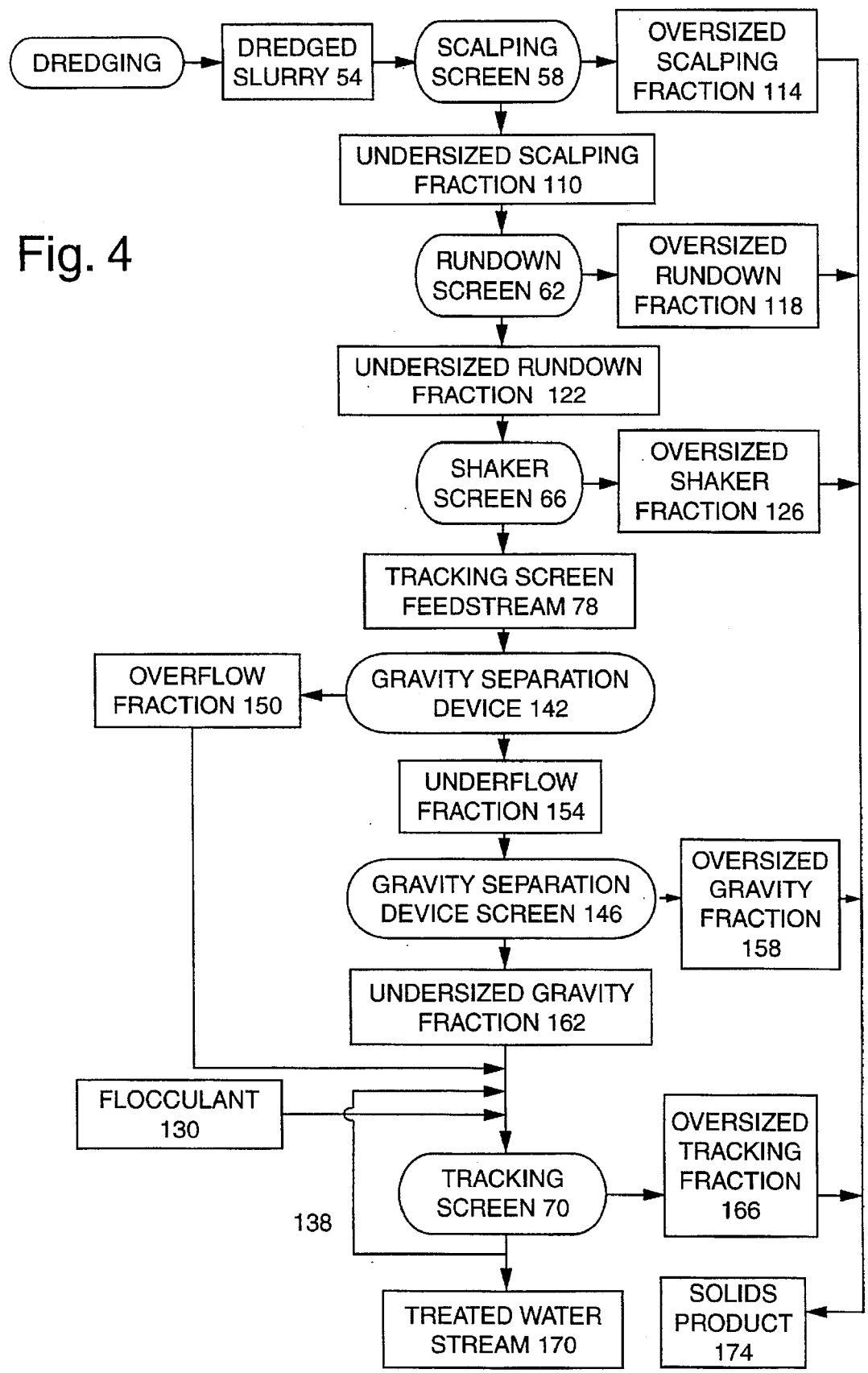
FIG. 4 is a flow schematic of a second embodiment of the present invention.

In a second embodiment shown in FIG. 4, the water treatment system includes a gravity separation device 142 and a gravity separation device screen 146. The gravity separation device 142 and screen 146 together enhance the efficiency of the tracking screen 70 by removing additional solids before screening. The gravity separation device 142 can be a cyclone, centrifuge, and the like. The preferred gravity separation device 142 is a HI "G" DRYER manufactured by DERRICK CORPORATION. The screen 146 preferably has a screen size ranging from about 100 to about 270 mesh (Tyler). This embodiment is not beneficial where a significant portion of the removed solid materials has a specific gravity close to one.

The operation of the second embodiment is similar to the preferred embodiment with certain exceptions. The tracking screen feedstream 78 is first passed through the gravity separation device 142 to form an overflow fraction 150 and an underflow fraction 154. The underflow fraction 154 is passed through the screen 146 to form an oversized gravity fraction 158 and an undersized gravity fraction 162. The overflow fraction 150 and the undersized fraction 162 are combined and contacted with the flocculent 130 and recycle stream 138 and passed over the tracking screen 70 to form the treated water stream 170 and oversized tracking fraction 166. The oversized tracking fraction 166 forms a part of the dewatered solids product 174.

Figure 5A:
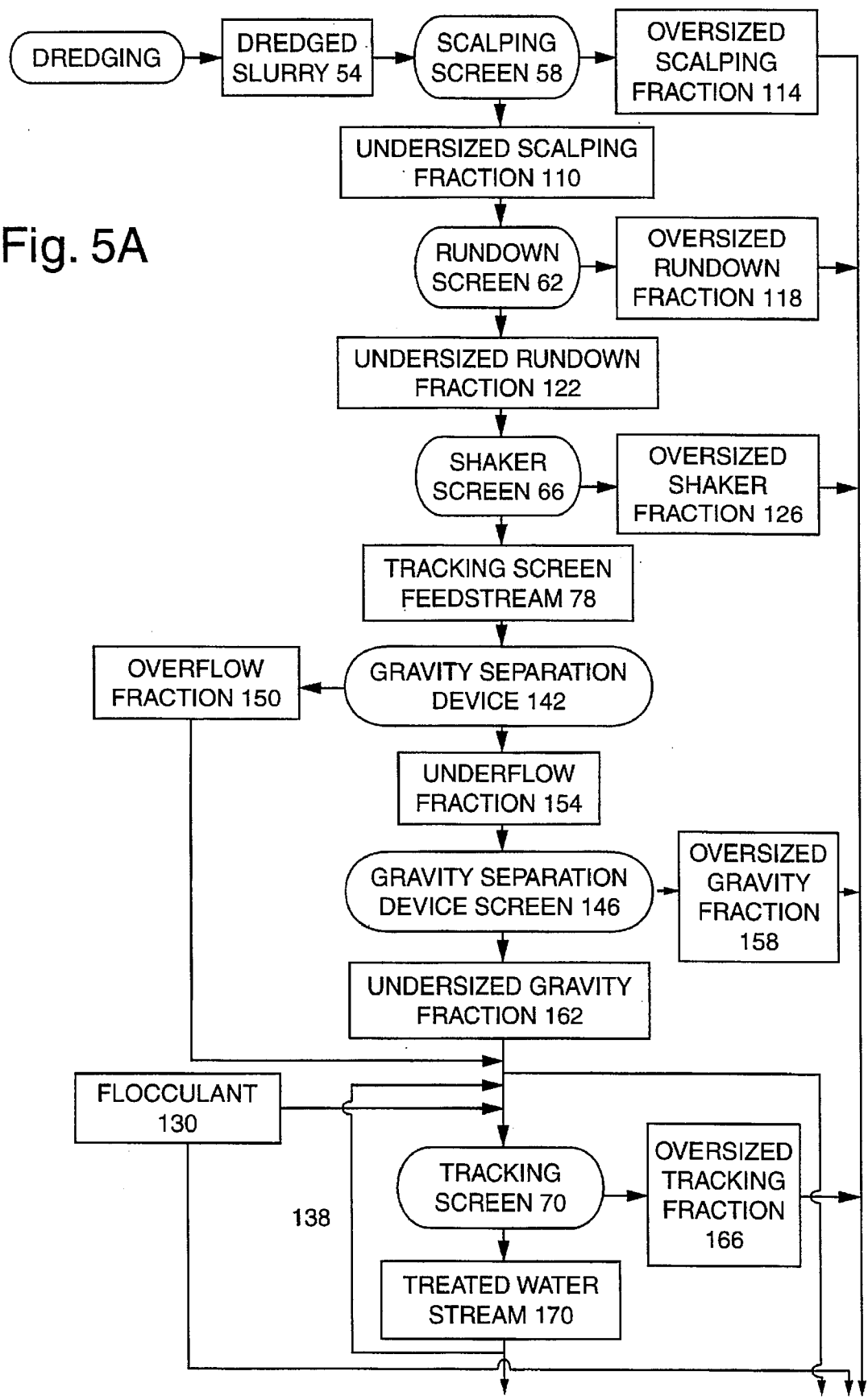
FIG. 5 is a flow schematic of a third embodiment of the present invention.
Figure 5B:
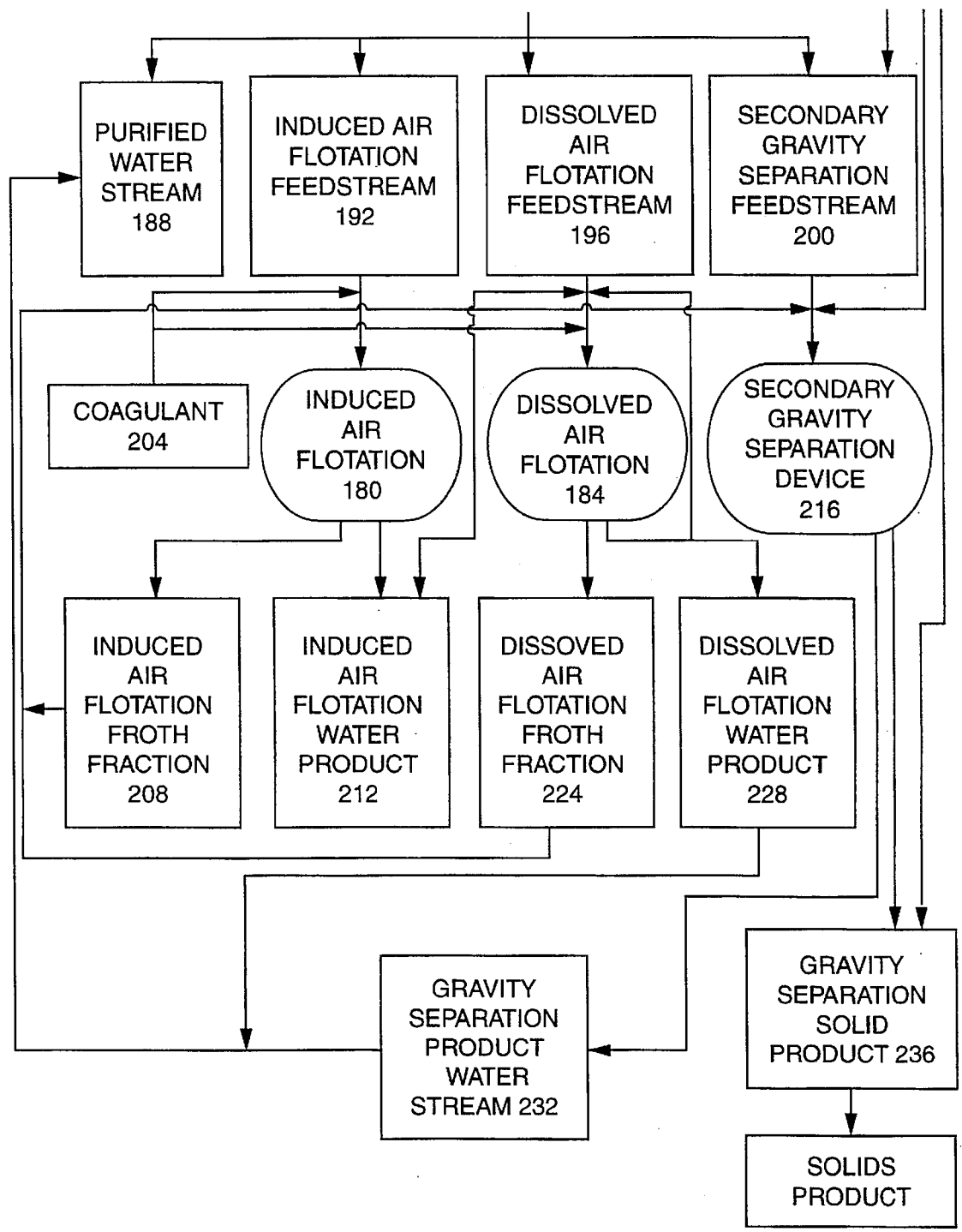

In a third embodiment shown in FIG. 5, the water treatment system includes the components of the preferred and second embodiments as well as a flotation system and a secondary gravity separation device. In one aspect of the third embodiment, the flotation system includes both an induced air flotation device 180 and a dissolved air flotation device 184.

This embodiment is particularly useful for applications requiring a purified water stream 188 having an extremely low solids content. Examples of such applications are dredged slurries containing environmentally harmful or toxic solid contaminants. The purified water stream 188 has an extremely low solids content, preferably no more than about 0.5% by weight solids and more preferably no more than about 0.25% by weight solids and most preferably no more than about 0.10% by weight solids.

The induced air flotation or dissolved air flotation devices 180, 184 can be any suitable devices. It is preferred that the DAVIS HI-EFFICIENCY and DAVIS HI-RATE DAF be used for the induced air flotation device 180 and dissolved air flotation device 184, respectively.

The secondary gravity separation device can be any suitable cyclone or centrifuge. The preferred gravity separation device is the SHARPLES CENTRIFUGE provided by DERRICK EQUIPMENT COMPANY.

The operation of the third embodiment is the same as the preferred and second embodiments with the following exceptions. The treated water stream 170 is split into five fractions, with one fraction being the purified water stream 188, another the induced air flotation feedstream 192, another the dissolved air flotation feedstream 196, another the secondary gravity separation feedstream 200 and another the tracking screen recycle stream 138. The amount of the treated water stream that goes to each fraction is a function of the level of turbidity acceptable and the solids characteristics. For example, a drinking water supply application may require that high purity water be produced, thus benefitting from the use of induced air or dissolved air flotation; an application with high density solid particles may benefit from the use of gravity separation methods which are effective for high density particle separation.

The induced air flotation and dissolved air flotation feedstreams 192, 196 can be contacted with a coagulant and/or flocculent 204 to improve the floatability of the solids. The flocculent 130 will also assist flotation but a significant fraction of the flocculent is generally removed with the oversized tracking fraction 166. The preferred coagulants can be the same as the preferred flocculents noted above. Although the amount of coagulant 204 contacted with the feedstreams 192, 196 depends upon the feedstreams' characteristics, it is preferred that the amount be less than about 0.05% by weight and more preferably range from about 0.005 to about 0.05% by weight and most preferably range from about 0.005 to about 0.01% by weight. An in-line mixer (not shown) can be employed to mix the coagulant 204 with the feedstreams.

The induced air flotation feedstream 192 is aerated to produce an induced air flotation froth fraction 208 and an induced air flotation water product 212. The induced air flotation froth fraction 208 is treated by the secondary gravity separation device 216 as discussed below.

The induced air flotation water product 212 along with the dissolved air flotation feedstream 196 and recycle flotation stream 220 are aerated to produce a dissolved air flotation froth fraction 224 and dissolved air flotation water product 228. Like the induced air flotation froth fraction 208, the dissolved air flotation froth fraction is treated by the secondary gravity separation device 216 as discussed below. The recycle flotation stream 220 is a split of the dissolved air flotation water product 228 that is used to reclaim aerated water, reduce air compressor energy requirements, and control slurry density.

The induced air flotation and dissolved air flotation froth fractions 208, 224 and secondary gravity separation feedstream 200 are combined with a flocculent 130 and gravity separated into a gravity separation water product 232 and a gravity separation solids product 236. The gravity separation water product is combined with the dissolved air flotation water product 228 and treated water stream 170 to form the purified water stream 188.

Alternatively, the induced air flotation and dissolved air flotation steps can be sequential with the induced air flotation product 212 being equivalent to the dissolved air flotation feedstream 196. In FIG. 5, the induced air flotation and dissolved air flotation steps are depicted as being partially sequential and singular. The desired configuration will depend upon the application.

As shown by the various embodiments above, the present invention can include any number and types of components arranged in a variety of configurations depending upon the characteristics of the sediments and the dewatered solids product and treated water stream to be produced. The scalping screen can be used to separate and dewater larger particles, vibratory shaker screens to separate and dewater medium size particles, gravity separation devices to separate and dewater denser medium- and fine-sized particles, tracking screens to remove and dewater flocculated agglomerates, dissolved air and/or induced air flotation to remove any remaining solids from the treated water stream, and a secondary gravity separation device to dewater solids in the dissolved air flotation froth fraction and induced air flotation froth fraction.

EXPERIMENT 1

The system of the third embodiment was modeled on a dredged slurry feed having the characteristics shown in Table 1 below. The gravity separation device was a cyclone, and the secondary gravity separation device was a centrifuge.

TABLE 1

FEED CHARACTERISTICS
Dredge Output    1200 gpm    20.00% dry solids by weight

| | | | | | | | |
|---|---|---|---|---|---|---|---|
| Particle Size, mm maximum – | | 12.700 | 1.651 | 0.104 | 0.053 | 0.038 | |
| Particle Size, mm minimum + | 12.700 | 1.651 | 0.104 | 0.053 | 0.038 | –0.838 | |
| Process Unit | Scalping | Rundown | Shakers | Cyclones | Cyclone Screen | Tracking Screen | Total |
| Screen Size, Tyler Standard Sieve Series | | 10 | 150 | 270 | 400 | –0.038 | |
| Solids Density, Dry lb/cf | 80.00 | 95.00 | 100.00 | 105.00 | 70.00 | 65.00 | 82.47 |
| Dry Solids Distribution, wt % | 2.00% | 5.00% | 25.00% | 20.00% | 40.00% | 8.00% | 100.00% |
| Dry Solids in Feed, wt % of total feed | 0.40% | 1.00% | 5.00% | 4.00% | 8.00% | 1.60% | 20.00% |
| Dry Solids in Feed, vol % of total feed | 0.31% | 0.66% | 3.18% | 2.42% | 7.19% | 1.54% | 15.91% |

The screen sizes of the scalping screen 58, rundown screen 62, shaker screen 66, gravity separation device screen 154, and tracking screen 70 and other process characteristics are shown in Table 2 below. The process flow summary is presented in Tables 3–5 below.

TABLE 2

PROCESS CHARACTERISTICS Flocculent to Tracking Screen

| | Screen Size | | Feed Stream Cut, Dry wt % Feed Solids to Product Solids | | | | | | |
|---|---|---|---|---|---|---|---|---|---|
| Process Unit | Tyler No | mm | Scalping | Rundown | Shakers | Cyclones | Cyclone Screen | Tracking Screen | wt % Solids in Product |
| Scalping Screen | | 12.700 | 100.0% | 1.00% | 0.00% | 0.00% | 0.00% | 0.00% | 95.00% |
| Rundown Screen | 10 | 1.651 | 100.00% | 100.00% | 3.00% | 2.00% | 1.00% | 1.00% | 80.00% |
| Shaker Screen | 150 | 0.104 | 100.00% | 100.00% | 100.00% | 10.00% | 5.00% | 2.00% | 70.00% |
| Cyclones | | | 100.00% | 100.00% | 100.00% | 75.00% | 10.00% | 5.00% | 55.00% |
| Cyclone Screen | 270 | 0.053 | 100.00% | 100.00% | 100.00% | 100.00% | 10.00% | 5.00% | 75.00% |
| Tracking Screen | Avg % Eff = 50.00% | 0.038 | 50.00% | 50.00% | 50.00% | 50.00% | 50.00% | 50.00% | 60.00% |
| Induced Air Flotation (IAF) | 80.00% | | 80.00% | 80.00% | 80.00% | 80.00% | 80.00% | 80.00% | 40.00% |
| Dissolved Air Flotation (DAF) | 85.00% | | 85.00% | 85.00% | 85.00% | 85.00% | 85.00% | 85.00% | 40.00% |
| Centrifuge | 90.00% | | 90.00% | 90.00% | 90.00% | 90.00% | 90.00% | 90.00% | 60.00% |

Distribution of Tracking Screen (70) Undersized Fraction      30.0% of DAF Product
  0.0% to Purified Water (188)
  90.0% to IAF Feedstream (192)
  10.0% to Recycle (138)
  0.0% to DAF Feedstream (196)
  0.0% to Secondary Gravity Separation Feedstream (200)

TABLE 3

PROCESS FLOW SUMMARY

| | | | | Solids Flow (dry lb/hr) by Size Fraction, maximum size in mm | | | | | |
|---|---|---|---|---|---|---|---|---|---|
| Unit Operation | Stream No. and Product | | Screen Opening mm | 12.7 | 12.7 / 1.651 | 1.651 / 0.104 | 0.104 / 0.053 | 0.053 / 0.038 | 0.038 |
| Dredge | 54 | Slurry | | 2525 | 6314 | 31568 | 25255 | 50509 | 10102 |
| Scalping Screen | 114 | OS | 12.700 | 2525 | 63 | 0 | 0 | 0 | 0 |
| | 110 | US | | 0 | 6251 | 31568 | 25255 | 50509 | 10102 |
| Rundown Screen | 118 | OS | 1.651 | 0 | 6251 | 947 | 505 | 505 | 101 |
| | 122 | US | | 0 | 0 | 30621 | 24750 | 50004 | 10001 |
| Shaker Screen (Flowline) | 126 | OS | 0.104 | 0 | 0 | 30621 | 2475 | 2500 | 200 |
| | 78 | US | | 0 | 0 | 0 | 22275 | 47504 | 9801 |
| Cyclone (High G) | 150 | OS | | 0 | 0 | 0 | 16706 | 4750 | 490 |

TABLE 3-continued

PROCESS FLOW SUMMARY

| Unit Operation | Stream No. and Product | | Screen Opening mm | Solids Flow (dry lb/hr) by Size Fraction, maximum size in mm | | | | | |
|---|---|---|---|---|---|---|---|---|---|
| | | | | 12.7 | 12.7 1.651 | 1.651 0.104 | 0.104 0.053 | 0.053 0.038 | 0.038 |
| | 154 | OF | | 0 | 0 | 0 | 5569 | 42754 | 9311 |
| Cyclone Screen | 158 | OS | 0.053 | 0 | 0 | 0 | 16706 | 475 | 25 |
| | 162 | US | | 0 | 0 | 0 | 0 | 4275 | 466 |
| Tracking Screen | 166 | OS | 0.038 | 0 | 0 | 0 | 2784 | 23515 | 4888 |
| 10.0% to Recycle | 138 | US | | 0 | 0 | 0 | 309 | 2613 | 543 |
| 0.0% to Recov Water | 188 | US | | 0 | 0 | 0 | 0 | 0 | 0 |
| 90.0% to IAF | 192 | US | | 0 | 0 | 0 | 2784 | 23515 | 4888 |
| 0.0% to DAF | 196 | US | | 0 | 0 | 0 | 0 | 0 | 0 |
| 0.0% to Centrifuge | 200 | US | | 0 | 0 | 0 | 0 | 0 | 0 |
| Induced Air Flotation (IAF) | 208 | FS | | 0 | 0 | 0 | 2227 | 18812 | 3911 |
| | 212 | UF | | 0 | 0 | 0 | 557 | 4703 | 978 |
| Dissolved Air Flotation (DAF) | 224 | FS | | 0 | 0 | 0 | 473 | 3997 | 831 |
| | 228 | UF | | 0 | 0 | 0 | 119 | 1008 | 209 |
| | 220 | RC | | 0 | 0 | 0 | 36 | 302 | 63 |
| | | Water | | 0 | 0 | 0 | 84 | 705 | 147 |
| Centrifuge | 236 | Sludge | | 0 | 0 | 0 | 2431 | 20528 | 4267 |
| | 232 | Water | | 0 | 0 | 0 | 270 | 2281 | 474 |
| Purified Water | 188 | Water | | 0 | 0 | 0 | 354 | 2986 | 621 |
| Solids Product | | Solids | | 2525 | 6314 | 31568 | 24901 | 47523 | 9481 |
| Totals | | | | 2525 | 6314 | 31568 | 25255 | 50509 | 10102 |

1072 gpm flow and 11.48% solids in combined Tracking Screen Feed (Streams 150, 162)
1180 gpm flow and 11.01% solids in combined Tracking Screen feed and recycle (Streams 138, 150, 162)

TABLE 4

STREAM FLOWS BY WEIGHT

| Unit Operation | Stream No. and Product | | Solids Flow dry lb/hr | Solids Removed cum lb/hr | Solids Content dry wt % | Total Flow lb/hr | Water Flow lb/hr |
|---|---|---|---|---|---|---|---|
| Dredge | 54 | Slurry | 126274 | | 20.02% | 630628 | 504353 |
| Scalping Screen | 114 | OS | 2589 | 2589 | 95.00% | 2725 | 136 |
| | 110 | US | 123685 | | 19.70% | 627901 | 504217 |
| Rundown Screen | 118 | OS | 8309 | 10897 | 80.00% | 10386 | 2077 |
| | 122 | US | 115376 | | 18.68% | 617515 | 502139 |
| Shaker Screen (Flowline) | 126 | OS | 35797 | 46694 | 70.00% | 51138 | 15341 |
| | 78 | US | 79580 | | 14.50% | 566378 | 486798 |
| Cyclone (High-G) | 150 | UF | 21946 | | 55.00% | 39903 | 17956 |
| | 154 | OF | 57633 | | 10.95% | 526475 | 468842 |
| Cyclone Screen | 158 | US | 17206 | 63899 | 75.00% | 22941 | 5735 |
| | 162 | OS | 4741 | | 27.95% | 16962 | 12221 |
| Tracking Screen | 166 | OS | 31187 | 95086.5 | 60.00% | 51978 | 20791 |
| 10.0% to Recycle | 138 | US | 3465 | | 6.35% | 54606 | 51141 |
| 0.0% to Purif Water | 188 | US | 0 | | NA | 0 | 0 |
| 90.0% to IAF | 192 | US | 31187 | | 6.35% | 491458 | 460271 |
| 0.0% to DAF | 196 | US | 0 | | NA | 0 | 0 |
| 0.0% to Centrifuge | 200 | US | 0 | | NA | 0 | 0 |
| Induced Air Flotation (IAF) | 208 | FS | 24950 | | 40.00% | 62374 | 37424 |
| | 212 | UF | 6237 | | 1.45% | 429084 | 422847 |
| Dissolved Air Flotation (DAF) | 224 | FS | 5302 | | 40.00 | 13254 | 7953 |
| | 228 | UF | 1337 | | 0.2250% | 594043 | 592706 |
| | 220 | RC | 401 | | 0.2250% | 178213 | 177812 |
| | | Water | 936 | | 0.2250% | 415830 | 414894 |
| Centrifuge | 236 | Sludge | 27226 | 122313 | 60.00% | 45377 | 18151 |
| | 232 | Water | 3025 | | 10.0000% | 30251 | 27226 |
| Purified Water | 188 | Water | 3961 | 31.4% | 0.8879% | 446081 | 442121 |
| Solids Product | | Solids | 122313 | 96.86% | 66.2780% | 184545 | 62232 |
| Totals | | | 126274 | 100.00% | 20.0235% | 630626 | 504353 |

TABLE 5

STREAM FLOWS BY VOLUME

| Unit Operation | Stream No. and Product | | Solids Density dry lb/cf | Solids Flow cum lb/hr | Solids Flow cf/cr | Solids Removed cum cy/cr | Solids Flow gpm | Water Flow gpm | Total Flow gpm |
|---|---|---|---|---|---|---|---|---|---|
| Dredge | 54 | Slurry | 82.5 | 1531.21 | 56.71 | | 190.89 | 1009.1 | 1200.0 |
| Scalping Screen | 114 | OS | 80.3 | 32.23 | 1.19 | 1.19 | 4.02 | 0.3 | 4.3 |
| | 110 | US | 82.5 | 1498.98 | 55.52 | | 186.87 | 1008.8 | 1195.7 |
| Rundown Screen | 118 | OS | 93.5 | 88.85 | 3.29 | 4.48 | 11.08 | 4.2 | 15.2 |
| | 122 | US | 81.8 | 1410.13 | 52.23 | | 175.80 | 1004.7 | 1180.5 |
| Shaker Screen (Flowline) | 126 | OS | 97.1 | 368.58 | 13.65 | 18.14 | 45.95 | 30.7 | 76.6 |
| | 78 | US | 76.4 | 1041.55 | 38.58 | | 129.95 | 974.0 | 1103.8 |
| Cyclone (High-G) | 150 | UF | 93.6 | 234.51 | 8.69 | | 29.24 | 35.9 | 65.2 |
| | 154 | UF | 71.4 | 807.05 | 29.89 | | 100.61 | 938.1 | 1038.7 |
| Cyclone Screen | 158 | US | 103.5 | 166.27 | 6.16 | 24.29 | 20.73 | 11.5 | 32.2 |
| | 162 | OS | 69.5 | 68.24 | 2.53 | | 8.51 | 24.5 | 33.0 |
| Tracking Screen | 166 | OS | 71.3 | 437.64 | 16.21 | 40.50 | 54.56 | 41.6 | 96.2 |
| 10.0% to Recycle | 138 | US | 71.3 | 48.63 | 1.80 | | 6.06 | 102.3 | 108.4 |
| 0.0% to Recov Water | 188 | US | NA | NA | 0.00 | | 0.00 | 0.0 | 0.0 |
| 90.0% to IAF | 192 | US | 71.3 | 437.64 | 16.21 | | 54.56 | 920.9 | 975.5 |
| 0.0% to DAF | 196 | US | NA | NA | 0.00 | | 0.00 | 0.0 | 0.0 |
| 0.0% to Centrifuge | 200 | US | NA | NA | 0.00 | | 0.00 | 0.0 | 0.0 |
| Induced Air Flotation (IAF) | 208 | FS | 71.3 | 350.11 | 12.97 | | 43.65 | 74.9 | 118.5 |
| | 212 | UF | 71.3 | 87.53 | 3.24 | | 10.91 | 846.0 | 856.9 |
| Dissolved Air Flotation (DAF) | 224 | FS | 71.3 | 74.4 | 2.76 | | 9.28 | 15.9 | 25.2 |
| | 228 | UF | 71.3 | 18.76 | 0.69 | | 2.34 | 1185.9 | 1188.2 |
| | 220 | RC | 71.3 | 5.63 | 0.21 | | 0.70 | 355.8 | 356.5 |
| | | Water | 71.3 | 13.13 | 0.49 | | 1.64 | 830.1 | 831.8 |
| Centrifuge | 236 | Sludge | 71.3 | 382.06 | 14.15 | 54.65 | 47.63 | 36.3 | 83.9 |
| | 232 | Water | 71.3 | 42.45 | 1.57 | | 5.29 | 54.5 | 59.8 |
| Purified Water | 188 | Water | 71.3 | 55.58 | 2.06 | 3.63% | 6.93 | 884.6 | 891.5 |
| Solids Product | | Solids | 82.9 | 1475.63 | 54.65 | 96.37% | 183.96 | 124.5 | 308.5 |
| Totals | | | 82.5 | 1531.21 | 56.71 | 100.00% | 190.89 | 1009.1 | 1200.0 |

857 gpm flow and 1.45% solids in combined DAF feed (Streams 196, 212)
8879 ppm solids in purified water
1213 gpm flow and 1.09% solids in combined DAF feed and recycle (Streams 196, 212 and 220)

As can be seen from the various Tables, the process of FIG. 5 effectively reduces the solids content of the purified water stream 188 to 8879 ppm at relatively high system throughput rates (i.e., 1200 gpm). Accordingly, the present invention is capable of providing a purified water stream having significantly lower solids content at a significantly higher throughput rate than existing dredging operations.

EXPERIMENT 2

A number of feed slurry flocculation tests were conducted utilizing the tracking screen a dredged slurry from a small lake. The flocculent was an anionic emulsion polymer sold under the trademark "GREATFLOC 5054". The flocculent addition rate was calculated from laboratory data, slurry flowrate and pulp density. Slurry flowrate was measured by a paddle wheel sensor located at the inlet point, and by a weir immediately preceding the upper weir tube. The sensor was subject to failure when filamentous debris wrapped around the paddle wheel shaft, inhibiting rotation. Measurement of flow height over the weir therefore became the sole method of flow rate measurement. Pulp density was measured using a Marcy scale; samples were obtained at the feed inlet.

Flocculent was prepared using a two-stage dilution procedure. A liquid polymer preparation system, consisting of a variable-speed gear pump, calibration tube, water flow meter and in-line static mixer, performed the first dilution. Primary diluted flocculent was held in a 200-gallon tank. Secondary dilution occurred continuously during operation by introduction of primary-diluted flocculent by a variable-speed gear pump, and lake water to a static mixer. Both streams' flowrates were measured by a rotameter.

System start-up used flocculent diluted to 0.5 volume % of the as-received concentration as primary diluted material. The maximum slurry flowrate that could be provided by operations during that period was 250–300 gpm at a pulp density of 5% solids (w/w), well below the design flow and density values of 1200 gpm and 15% solids (w/w). These data indicated a flocculent flowrate (dosage=1.6 lbs/ton) of 5 gpm plus 30 gpm dilution water (target final flocculent concentration=0.5%). When observation disclosed no visible flocculation, the dosage was increased to approximately 2.25 lbs/ton and then to approximately 3.2 lbs/ton. Clear water was observed overflowing the tracking screen feed weirs, indicating that flocculation and separation were occurring in the piping/weir system. Because flocculent flowrate measurement was problematic at the low slurry flowrates and flocculent concentrations employed, two modifications were made. A new batch of primary diluted flocculent was prepared at 0.25% concentration, and the slurry flowrate was increased to approximately 500 gpm. Successful flocculation of solids in the slurry was then realized.

In another run (i.e., Run #2), the slurry flowrate was stabilized at approximately 600 gpm and pulp density was 6.0% solids (w/w). Flocculent dosage was set at 2.0 lbs/ton with a delivered concentration of 0.05%. Approximately 15% (10 gpm) of the total flocculent flowrate was diverted to a second injection point, with the balance injected at the first injection point. Additionally, a vertical baffle, projecting downward below the water level was fitted to the weir tube to moderate wave action induced by the inlet weir overflow cascade.

Floccules successfully formed, separated on the screens, agglomerated, migrated to lower screens, and dewatered. Slurry discharge areas where the flow was gentle and/or laminar showed good accumulations of floccules. Screens under high energy/turbulent areas did not accumulate floccules as well. The results of this test conclusively established that the system was capable of flocculating, separating, and dewatering finely sized particles. Good results were achieved with from about 80 to about 90% of the flocculent directed to the primary injection point with the balance being directed to the secondary injection point.

In another run (i.e., Run #3), the objective was to repeat and maintain the performance observed during Run #2. Slurry flowrate target was about 600 to about 500 gpm and the target flocculent dosage was about 2.0 plus or minus 0.5 lbs/ton. A flocculent was injected at points 1 and 2. The split was varied (from about 70% to about 90% at point 1 and from about 10% to about 30% at point 2) to determine effect.

In another run (i.e., Run #4), the objective was to operate continuously with consistent solids production for an extended period. Additionally, it was desired that injection of flocculent at point 1 only be evaluated.

The results of the various demonstrations are set forth in Tables 6–9 below.

TABLE 6

| Average Moisture Content, %, by Operation | | | | |
|---|---|---|---|---|
| Scalping Screen ("SS") | Linear Shakers ("LS") | HI-G Dryer ("HI-G") | Centrifuge ("CENT") | Tracking Screen Overflow |
| 21.7% | 15.9% | 24.4% | 29.1% | 64.7% |

TABLE 7

| Sample Data | | | Analysis Aliquot | | Moisture, |
|---|---|---|---|---|---|
| Run | ID | Wet Wt., g | Wet Wt., g | Dry Wt., g | Weight % |
| 1 | SS | 839.8 | 173.58 | 138.02 | 20.5% |
| 1 | LS | 909.0 | 193.15 | 154.28 | 20.1% |
| 1 | HI-G | 964.6 | 151.70 | 117.77 | 22.4% |
| 1 | CENT | 837.6 | 178.12 | 129.21 | 27.5% |
| CALCULATED COMPOSITE | | 3551.0 | 3551.0 | 2749.2 | 22.6% |
| 2 | SS | 761.8 | 265.06 | 200.05 | 24.5% |
| 2 | LS | 793.6 | 247.08 | 207.16 | 16.2% |
| 2 | HI-G | 833.6 | 125.88 | 91.31 | 27.5% |
| 2 | CENT | 634.7 | 154.50 | 104.21 | 32.6% |
| CALCULATED COMPOSITE | | 3023.7 | 3023.7 | 2299.6 | 23.9% |
| 3 | SS | 920.0 | 259.64 | 212.56 | 18.1% |
| 3 | LS | 791.4 | 196.68 | 167.52 | 14.8% |
| 3 | HI-G | 897.1 | 130.05 | 98.29 | 24.4% |
| 3 | CENT | — | — | — | — |
| CALCULATED COMPOSITE | | | | | NR |
| 4 | SS | NM | 296.27 | 226.33 | 23.6% |
| 4 | LS | NM | 224.11 | 196.37 | 12.4% |
| 4 | HI-G | NM | 310.06 | 237.25 | 23.5% |
| 4 | CENT | NM | 321.04 | 233.78 | 27.2% |
| CALCULATED COMPOSITE | | — | 1151.5 | 893.7 | 22.4% |

Moisture content reported on a wet weight basis: ((Wet Wt − Dry Wt) ÷ Wet Wt) × 100 = Weight % Moisture
NM = Not Measured
NR = Not Reported

TABLE 8

COMPOSITE DATA & DISTRIBUTION OF PARTICLE SIZES IN RECOVERED FOOTHILLS GC LAKE SEDIMENTS
PRODUCT COMPOSITE DATA

| | Sample ID | Wet Wt., g | % Moisture | Calc. Dry Wt., g | % of Composite |
|---|---|---|---|---|---|
| Scalping Screen Samples | SS Run #1 | 88.6 | 20.5% | 70.4 | 24.7% |
| | SS Run #2 | 97.4 | 24.5% | 73.5 | 25.8% |
| | SS Run #3 | 90.4 | 18.1% | 74.0 | 25.9% |
| | SS Run #3 | 88.3 | 23.6% | 67.5 | 23.6% |
| | SS Computed Total: | 364.7 | | 285.4 | |
| Linear Shaker | LS Run #1 | 79.0 | 20.1% | 63.1 | 23.1% |
| | LS Run #2 | 79.2 | 16.2% | 66.4 | 24.3% |

TABLE 8-continued

COMPOSITE DATA & DISTRIBUTION OF PARTICLE SIZES IN RECOVERED FOOTHILLS GC LAKE SEDIMENTS
PRODUCT COMPOSITE DATA

| | Sample ID | Wet Wt., g | % Moisture | Calc. Dry Wt., g | % of Composite |
|---|---|---|---|---|---|
| Samples | LS Run #3 | 80.4 | 14.8% | 68.5 | 25.1% |
| | LS Run #4 | 85.3 | 12.4% | 74.7 | 27.4% |
| | LS Computed Total: | 323.9 | | 272.7 | |
| HI-G Dryer Samples | HI-G Run #1 | 79.0 | 22.4% | 61.3 | 25.4% |
| | HI-G Run #2 | 79.3 | 27.5% | 57.5 | 23.8% |
| | HI-G Run #3 | 79.5 | 24.4% | 60.1 | 24.9% |
| | HI-G Run #4 | 81.4 | 23.5% | 62.3 | 25.8% |
| | HI-G Computed Total: | 319.2 | | 241.2 | |

TABLE 9

PRODUCT COMPOSITE PARTICLE SIZE ANALYSIS

| Target Cut: | Scalping Screen 24-Mesh | | Linear Shakers 80-Mesh | | High-G 140-Mesh | |
|---|---|---|---|---|---|---|
| Mesh (Tyler) | Mass, g | %, Direct | Mass, g | %, Direct | Mass, g | %, Direct |
| +10 | 65.6 | 23.5% | | 0.0% | | 0.0% |
| 10 × 35 | 84.7 | 30.4% | | 0.0% | | 0.0% |
| 35 × 65 | | 0.0% | 239.4 | 93.3% | | 0.0% |
| 65 × 100 | 22.5 | 8.1% | 10.8 | 4.2% | 116.1 | 62.9% |
| 100 × 150 | 106.0 | 38.0% | 5.4 | 2.1% | 40.2 | 21.7% |
| 150 × 200 | | 0.0% | 1.0 | 0.4% | 23.1 | 12.5% |
| −200 | | 0.0% | | 0.0% | 5.3 | 2.9% |
| | | 100.0% | | 100.0% | | 100.0% |

Notes: Three composites were prepared from production samples taken from Runs #1–4. Approximately equal weights of individual samples were used at their as-produced moisture content to generate each composite sample. Each composite was wet-screened at the finest screen size in its respective series. Oversized solids were dried, then dry-screened on a Ro-Tap machine.

EXPERIMENT 3

The system of the third embodiment, excluding the run-down screen, induced air flotation and dissolved air flotation process steps, was modeled on a dredged slurry feed having the characteristics shown in Table 10 below.

TABLE 10

FEED CHARACTERISTICS
Dredge Output 1200 gpm 10.00% dry solids, by weight

| | | | | | | | |
|---|---|---|---|---|---|---|---|
| Particle Size mm maximum − | | 0.701 NA | | 0.175 NA | | 0.104 | |
| Particle Size mm minimum + | 0.701 NA | | 0.175 NA | | 0.104 NA | | |
| Process Unit | Scalping | Rundown | Shakers | Cyclones | Cyclone Screen | Tracking Screen | Total |
| Screen Size, Tyler Standard Sieve Series | 24 | NA | 80 | NA | 150 | NA | |
| Solids Bulk Density, dry lb/cf | 157 | 143 | 159 | 159 | 157 | 147 | 152.73 |
| Dry Solids Distribution, wt % | 12.50% | 0.00% | 18.90% | 0.00% | 22.40% | 46.20% | 100.00% |
| Dry Solids in Feed, wt % of total feed | 1.25% | 0.00% | 1.89% | 0.00% | 2.24% | 4.62% | 10.00% |
| Dry Solids in Feed, vol % of total feed | 0.50% | 0.00% | 0.75% | 0.00% | 0.90% | 2.01% | 4.34% |

The screen sizes of the scalping screen 58, shaker screen 66, gravity separation device screen 154, tracking screen 70 and other process characteristics are shown in Table 11 below. The process flow summary is presented in Tables 12 through 13 below.

TABLE 11

PROCESS CHARACTERISTICS

Flocculent to Tracking Screen: Yes
Coagulant to IAF: NA
Coagulant to DAF: NA
Flocculent to Centrifuge: None Feed Stream Cut, Dry wt % Feed Solids to Product Solids

| Process Unit | Screen & Opening Tyler No | mm | Scalping | Rundown | Shakers | Cyclones | Cyclone Screen | Tracking Screen | wt % Solids in Product |
|---|---|---|---|---|---|---|---|---|---|
| Scalping Screen | 24 | 0.701 | 100.0% | 0.00% | 4.00% | 3.00% | 2.00% | 1.00% | 78.30% |
| Rundown Screen | NA | NA | 100.00% | 0.00% | 0.00% | 0.00% | 0.00% | 0.00% | NA |
| Shaker Screen | 80 | 0.175 | 100.00% | 0.00% | 100.00% | 4.00% | 3.00% | 2.00% | 84.10% |
| Cyclones | NA | NA | 100.00% | 0.00% | 100.00% | 75.00% | 4.00% | 3.00% | 55.00% |
| Cyclone Screen | 150 | 0.104 | 100.00% | 0.00% | 100.00% | 100.00% | 100.00% | 4.00% | 75.60% |
| Tracking Screen | Avg % Eff = 85.00% | | 85.00% | 85.00% | 85.00% | 85.00% | 85.00% | 85.00% | 35.30% |
| Induced Air Flotation (IAF) | NA | | NA | NA | NA | NA | NA | NA | NA |
| Dissolved Air Flotation (DAF) | NA | | NA | NA | NA | NA | NA | NA | NA |
| Centrifuge | 95.00% | | 95.00% | 95.00% | 95.00% | 95.00% | 95.00% | 95.00% | 70.90% |

High "G" Dryer Discharge Distribution: 72.5% to Tracking Screen (150/162a), 27.5% to Centrifuge (150/162b)
Tracking Scrn US (70) Distribn: 100.0% to Recovered Water (188) 0.0% to IAF (192) NA DAF PRODUCT
0.0% to Recycle (138) 0.0% to DAF (196) 0.0% to Centrifuge (200) (228) to Recycle (220)

TABLE 12

PROCESS FLOW SUMMARY

| | | | Solids Flow (dry lb/hr) by Size Fraction, max/min size in mm | | | | | |
|---|---|---|---|---|---|---|---|---|
| Unit Operation | Stream No. and Product | Screen Size Tyler # | 0.701 | 0.701 NA | NA 0.175 | 0.175 NA | NA 0.104 | 0.104 |
| Dredge | 54 | Slurry | 7980 | 0 | 12066 | 0 | 14300 | 29494 |
| Scalping Screen | 114 | OS | 24 | 7980 | 0 | 483 | 0 | 286 | 295 |
| | 110 | US | | 0 | 0 | 11583 | 0 | 14014 | 29199 |
| Rundown Screen | 118 | OS | NA | 0 | 0 | 0 | 0 | 0 | 0 |
| | 122 | US | | 0 | 0 | 11583 | 0 | 14014 | 29199 |
| Shaker Screen | 126 | OS | 80 | 0 | 0 | 11583 | 0 | 420 | 584 |
| (Flowline) | 78 | US | | 0 | 0 | 0 | 0 | 13594 | 28615 |
| Cyclone (High-G) | 150 | UF | | 0 | 0 | 0 | 0 | 544 | 858 |
| | 154 | OF | | 0 | 0 | 0 | 0 | 13050 | 27757 |
| Cyclone Screen | 158 | OS | 150 | 0 | 0 | 0 | 0 | 544 | 34 |
| | 162 | US | | 0 | 0 | 0 | 0 | 0 | 824 |
| CY OF (HIGH G) + Cyclone Scr US to Tracking Screen | 150/162a | | | 0 | 0 | 0 | 0 | 9461 | 20721 |
| CY OF (HIGH G) + Cyclone Scr US to Centrifuge | 150/162b | | | 0 | 0 | 0 | 0 | 3589 | 7860 |
| Tracking Screen | 166 | OS | | 0 | 0 | 0 | 0 | 8042 | 17613 |
| 0.0% to Recycle | 138 | US | | 0 | 0 | 0 | 0 | 0 | 0 |
| 100.0% to Recov Water | 188 | US | | 0 | 0 | 0 | 0 | 1419 | 3108 |
| 0.0% to IAF | 192 | US | | 0 | 0 | 0 | 0 | 0 | 0 |
| 0.0% to DAF | 196 | US | | 0 | 0 | 0 | 0 | 0 | 0 |
| 0.0% to Centrifuge | 200 | US | | 0 | 0 | 0 | 0 | 0 | 0 |
| Induced Air Flotation (IAF) | 208 | FS | | 0 | 0 | 0 | 0 | 0 | 0 |
| | 212 | UF | | 0 | 0 | 0 | 0 | 0 | 0 |
| Dissolved Air Flotation (DAF) | 224 | FS | | 0 | 0 | 0 | 0 | 0 | 0 |
| | 228 | UF | | 0 | 0 | 0 | 0 | 0 | 0 |
| | 220 | RC | | 0 | 0 | 0 | 0 | 0 | 0 |
| | | Water | | 0 | 0 | 0 | 0 | 0 | 0 |
| Centrifuge | 236 | Sludge | | 0 | 0 | 0 | 0 | 3409 | 7467 |
| | 232 | Water | | 0 | 0 | 0 | 0 | 179 | 393 |

TABLE 12-continued

PROCESS FLOW SUMMARY

| Unit Operation | Stream No. and Product | | Screen Size Tyler # | Solids Flow (dry lb/hr) by Size Fraction, max/min size in mm | | | | | |
|---|---|---|---|---|---|---|---|---|---|
| | | | | 0.701 | 0.701 NA | NA 0.175 | 0.175 NA | NA 0.104 | 0.104 |
| Recovered Water | 188 | Water | | 0 | 0 | 0 | 0 | 1599 | 3501 |
| Recovered Solids | | Solids | | 7980 | 0 | 12066 | 0 | 12702 | 25993 |
| Totals | | | | 7980 | 0 | 12066 | 0 | 14300 | 29494 |

850 gpm flow and 6.81% solids in combined Tracking Screen feed (Streams 150, 162)
850 gpm flow and 6.81% solids in combined Tracking Screen feed and recycle (Streams 138, 150, 162)

TABLE 13

STREAM FLOWS BY WEIGHT

| Unit Operation | Stream No. and Product | | Solids Flow dry lb/hr | Solids Removed cum lb/hr | Solids Content dry wt % | Total Flow lb/hr | Water Flow lb/hr |
|---|---|---|---|---|---|---|---|
| Dredge | 54 | Slurry | 63840 | | 10.00% | 638395 | 574555 |
| Scalping Screen | 114 | OS | 9044 | 9044 | 78.30% | 11550 | 2506 |
| | 110 | US | 54796 | | 8.74% | 626845 | 572049 |
| Rundown Screen | 118 | OS | 0 | 9044 | NA | 0 | 0 |
| | 122 | US | 54796 | | 8.74% | 626845 | 572049 |
| Shaker Screen | 126 | OS | 12588 | 21631 | 84.10% | 14967 | 2380 |
| (Flowline) | 78 | US | 42209 | | 6.90% | 611878 | 569669 |
| Cyclone (High-G) | 150 | UF | 1402 | | 55.00% | 2549 | 1147 |
| | 154 | OF | 40807 | | 6.70% | 609329 | 568522 |
| Cyclone Screen | 158 | OS | 578 | 22209 | 75.60% | 765 | 187 |
| | 162 | US | 824 | | 46.17% | 1785 | 961 |
| CY OF (HIGH G) + Cyclone Scr US to Tracking Screen | 150/162a | | 30182 | | 6.81% | 443057 | 412875 |
| CY OF (HIGH G) + Cyclone Scr US to Centrifuge | 150/162b | | 11448 | | 6.81% | 168056 | 156608 |
| Tracking Screen | 166 | OS | 25655 | 47864.07 | 35.30% | 72677 | 47022 |
| 0.0% to Recycle | 138 | US | 0 | | NA | 0 | 0 |
| 100.0% to Recov Water | 188 | US | 4527 | | 1.22% | 370380 | 365853 |
| 0.0% to IAF | 192 | US | 0 | | NA | 0 | 0 |
| 0.0% to DAF | 196 | US | 0 | | NA | 0 | 0 |
| 0.0% to Centrifuge | 200 | US | 0 | | NA | 0 | 0 |
| Induced Air Flotation (IAF) | 208 | FS | 0 | | NA | 0 | 0 |
| | 212 | UF | 0 | | NA | 0 | 0 |
| Dissolved Air Flotation (DAF) | 224 | FS | 0 | | NA | 0 | 0 |
| | 228 | UF | 0 | | NA | 0 | 0 |
| | 220 | RC | 0 | | NA | 0 | 0 |
| | | Water | 0 | | NA | 0 | 0 |
| Centrifuge | 236 | Sludge | 10876 | 58740 | 70.90% | 15340 | 4464 |
| | 232 | Water | 572 | | 0.3748% | 152716 | 152144 |
| Purified Water | 188 | Water | 5100 | 7.99% | 0.9749% | 523097 | 517997 |
| Solids Product | | Solids | 58740 | 92.01% | 50.9460% | 115299 | 56559 |
| Totals | | | 63840 | 100.00% | 10.0000% | 638395 | 574555 |

As can be seen from the various Tables, the process of FIG. 5, using the recovery efficiencies shown, can effectively reduce the solids contents of the dredged slurry 54 from 10 wt. % to 0.97 wt. % in the purified water stream 188 at relatively high system throughput rates (e.g., 1200 gpm). Accordingly, the present invention is capable of providing a purified water stream having significantly lower solids content at a significantly higher throughput rate than existing waterway restoration operations.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A dredging method for removing solid materials from a body of water, comprising the steps of:
   (a) dredging solid materials from a body of water to form a dredged slurry containing removed solid materials and water;
   (b) first passing the dredged slurry through a coarse sizing screen having an opening size of at least about 150 microns to generate an oversized fraction comprised of removed solid materials and an undersized fraction including a treated slurry;
   (c) contacting a flocculent with said treated slurry to form a flocculated slurry containing flocculated solid materials; and
   (d) passing at least a portion of said flocculated slurry through a tracking screen to form a flocculated solid materials fraction and a treated water stream, wherein the flocculated solid materials have a velocity relative to the tracking screen, said velocity being no more than about 4 fps to inhibit comminution of the flocculated solid materials on the tracking screen.

2. The dredging method as claimed in claim 1, wherein said coarse sizing screen has an opening size ranging from about 150 mesh to about 48 mesh and further comprising before the passing step (b):

first passing said dredged slurry through a first screen, the first screen having an opening size ranging from about 0.25 to about 2 inches, to form first oversized and undersized fractions; and second passing said first undersized fraction through a second screen, the second screen having an opening size ranging from about 35 mesh (Tyler) to about 0.25 inches to form second oversized and undersized fractions.

3. The dredging method as claimed in claim 2, further comprising:

cycloning said treated slurry to remove solid materials having a specific gravity ranging from about 1.0 to about 4.0 to form third overflow and underflow fractions.

4. The dredging method as claimed in claim 3, further comprising before the passing step (b):

third passing said undersized fraction through a third screen having an opening size ranging from about 100 to about 270 mesh (Tyler) to form the treated slurry.

5. The dredging method as claimed in claim 1, wherein after said contacting step, said flocculent has a concentration in said flocculated slurry ranging from about 0.001 to about 0.025% by weight.

6. The dredging method as claimed in claim 1, wherein said flocculent is a polyacrylamide polymer.

7. The dredging method as claimed in claim 1, wherein in said passing step (d) the tracking screen has an opening size ranging from about 0.3 mm to about 1.70 mm.

8. The dredging method as claimed in claim 1, further comprising before the passing step (d):

floating said flocculated slurry to remove solid materials to form a froth fraction and underflow fraction and wherein said underflow fraction is passed through said tracking screen.

9. The dredging method as claimed in claim 8, wherein said floating step comprises:

contacting said flocculated slurry with a coagulant that is a polyacrylamide polymer.

10. The dredging method as claimed in claim 9, wherein the concentration of said coagulant in said flocculated slurry ranges from about 0.001 to about 0.025% by weight.

11. The dredging method as claimed in claim 1, wherein said treated water stream has a solids content of no more than about 1% by weight.

12. The dredging method as claimed in claim 1, further comprising:

centrifuging said treated water stream.

13. The dredging method as claimed in claim 1, wherein the treated slurry contains solids and at least about 95% by weight of the solids in the treated slurry have a size of no more than about 180 microns.

14. The dredging method as claimed in claim 1, wherein the passing step (d) wherein:

the tracking screen has an opening size ranging from about 0.3 to about 1.70 mm.

15. The dredging method as claimed in claim 1, wherein the treated water stream is output at a rate ranging from about 300 to about 2,000 gpm.

16. The dredging method as claimed in claim 1, wherein the flocculated solid materials fraction is output in the passing step (d) at a rate ranging from about 20 to about 90 cubic yards/hour.

17. The dredging method as claimed in claim 1, wherein the velocity of the flocculated slurry through the in-line mixer is at least about 3 fps.

18. The dredging method as claimed in claim 1, wherein the passing step (d) comprises:

passing said flocculated slurry through an upper portion of the tracking screen to form a first flocculated solid materials fraction and a partially treated water stream; and passing said partially treated water stream through a lower portion of the tracking screen, the lower portion being positioned transversely to the upper portion of the tracking screen, to form a second flocculated solid materials fraction and a treated water stream, wherein the flocculated solid materials have a velocity of descent on the tracking screen and the velocity of descent in the lower portion of the tracking screen is less than the velocity of descent in the upper portion of the tracking screen.

19. A dredging method for removing solid materials from a body of water, comprising the steps of:

(a) dredging solid materials from a body of water to form a dredged slurry containing removed solid materials and water;

(b) screening said dredged slurry to remove removed solid materials having a size of at least about 0.25 inches to form a treated slurry;

(c) screening said treated slurry to remove removed solid materials having a size of at least about 35 mesh (Tyler) to form a screened slurry, with at least about 95% by weight of the solids contained in the screened slurry having a particle size of no more than about 180 microns;

(d) contacting a polyacrylamide flocculent with said screened slurry to form a flocculated slurry containing flocculated solid materials;

(e) passing the flocculated slurry through an in-line mixer at a velocity of at least about 3 fps to form a mixed flocculated slurry; and (f) screening said mixed flocculated slurry to remove said flocculated solid materials having a size of at least about 0.3 mm to form a treated water stream containing no more than about 5% by weight of solid materials.

20. The dredging method as claimed in claim 19, wherein said screening step (f) comprises:

floating said mixed flocculated slurry in at least one of an induced air flotation device and a dissolved air flotation device to remove a portion of said solid materials in a froth fraction.

21. The dredging method as claimed in claim 19, wherein the treated water stream is output at a rate ranging from about 300 to about 2,000 gpm.

22. A dredging method for removing solid materials from a body of water, comprising the steps of:

(a) dredging solid materials from a body of water to form a dredged slurry containing removed solid materials and water;

(b) separating coarsely sized solid materials from said dredged slurry to form a treated slurry;

(c) contacting a flocculent with the treated slurry to form a flocculated slurry containing flocculated solid materials;

(d) passing the flocculated slurry through a first screen to form a partially screened flocculated slurry, the first screen having a first opening size and inclined from the horizontal at a first angle; and (e) passing the partially screened flocculated slurry through a second screen to form a treated water stream and recovered solids, the second screen having a second opening size and inclined from the horizontal at a second angle wherein the first angle is greater than the second angle, the first and second angles controlling the velocity of the flocculated particles as the flocculated particles descend the first and second screens.

23. The dredging method as claimed in claim 16, wherein the contacting step comprises:

passing the flocculated slurry though an in-line mixer.

24. The dredging method as claimed in claim 22, wherein the first angle ranges from about 40 to about 70 degrees.

25. The dredging method as claimed in claim 22, wherein the second angle ranges from about 30 to about 60 degrees.

26. The dredging method as claimed in claim 22, wherein the first opening size is less than the second opening size.

27. The dredging method as claimed in claim 22, wherein the residence time of the flocculated slurry on the first screen is less than the residence time of the partially flocculated slurry on the second screen.

28. The dredging method as claimed in claim 22, wherein the flocculated slurry contains from about 5 to about 15% by weight of solids.

29. The dredging method as claimed in claim 22, wherein the velocity of the flocculated particles on the first and second screens is no more than about 4 fps.

30. The dredging method as claimed in claim 22, wherein the velocity of the flocculated particles on the first and second screens is no more than about 0.25 to about 2 fps.

31. The dredging method as claimed in claim 22, wherein the flocculated particles fall onto the first and second screens and the free fall distance of the flocculated particles onto the first and second screens is no more than about 1 inch.

32. A dredging method for removing continuously solid materials from a body of water, comprising the steps of:

(a) dredging solid materials from a body of water to form a dredged slurry containing removed solid materials and water;

(b) passing the dredged slurry through a first screen having an opening size ranging from about 0.25 inches to about 2 inches to form first oversized and undersized fractions;

(c) passing said first undersized fraction through a second screen having an opening size ranging from about 35 mesh (Tyler) to about 0.25 inches to form second oversized and undersized fractions;

(d) passing said second undersized fraction through a third screen having an opening size ranging from about 150 mesh to about 48 mesh to form a screened slurry, with at least about 95% by weight of the solids contained in the screened slurry having a particle size of no more than about 180 microns;

(e) contacting a polyacrylamide flocculent with said screened slurry to form a flocculated slurry containing flocculated solid materials, wherein after the contacting step the flocculent has a concentration in the flocculated slurry ranging from about 0.001 to about 0.025% by weight;

(f) fourth passing the flocculated slurry through an in-line mixer at a velocity of at least about 3 fps to form a mixed flocculated slurry; and (g) passing the mixed flocculated slurry through a tracking screen having an opening size ranging from about 0.3 mm to about 1.70 mm to form a treated water stream containing no more than about 5% by weight of solid materials and removed flocculated solids, wherein the treated water stream is output at a rate ranging from about 300 to about 2,000 gpm; the tracking screen comprises at least two tracking screen portions, a first portion of the tracking screen being inclined at a first angle from the horizontal and a second portion of the tracking screen being inclined at a second angle from the horizontal, with the first and second angles having different magnitudes to control the velocity of descent of the flocculated particles on the tracking screen and thereby inhibit comminution of the flocculated particles on the tracking screen; and the flocculated particles have a free fall distance onto the tracking screen that is no more than about 1 inch.

\* \* \* \* \*